United States Patent [19]

Calabro et al.

[11] Patent Number: 4,707,796

[45] Date of Patent: Nov. 17, 1987

[54] RELIABILITY AND MAINTAINABILITY INDICATOR

[76] Inventors: Salvatore R. Calabro, 76 Earway Ave., Bellville, N.J. 07109; John A. Calabro, 101-14 Ascan Ave., Forest Hills, N.Y. 11375; Chun Hsu, 4811 Bradfurd Blvd., Huntsville, Ala. 35805

[21] Appl. No.: 894,759

[22] Filed: Aug. 13, 1986

Related U.S. Application Data

[63] Continuation of Ser. No. 542,452, Oct. 19, 1983, abandoned.

[51] Int. Cl.$^4$ .................... G01M 15/00; G06F 15/16
[52] U.S. Cl. ............................ 364/552; 364/551; 364/550; 73/117.3
[58] Field of Search .............. 364/552, 569, 551, 577, 364/550, 554, 506, 507, 492; 73/116, 117.3; 290/52

[56] References Cited

U.S. PATENT DOCUMENTS

| | | | |
|---|---|---|---|
| 3,357,239 | 12/1967 | Hohenberg | 364/550 |
| 3,362,217 | 1/1968 | Evans et al. | 364/550 |
| 3,841,149 | 10/1974 | Edwin et al. | 364/551 |
| 4,189,940 | 2/1980 | Hulls et al. | 364/551 |
| 4,335,600 | 6/1982 | Wu et al. | 73/117.3 |
| 4,366,544 | 12/1982 | Shima et al. | 364/550 |
| 4,402,054 | 8/1983 | Osborne et al. | 364/551 |
| 4,408,294 | 10/1983 | Imam | 364/552 |
| 4,517,468 | 5/1985 | Kemper et al. | 364/551 |

OTHER PUBLICATIONS

"Probe Data Analysis System", by Harris Controls, pp. 1-12, Melbourne, Florida, Oct. 1982.

Primary Examiner—Parshotam S. Lall
Attorney, Agent, or Firm—Stefan J. Klauber

[57] ABSTRACT

A Reliability and Maintainability Indicator (RAMI) is disclosed which effectively predicts the remaining time of operation of a system, equipment, component, or device before it would fail to perform its intended functions. The ability of RAMI to predict the remaining time of operation before failure is accomplished by having key parameters of an equipment monitored by applicable transducers to sense measurands periodically over a period of time. Then, these measurands are analyzed to project when they would reach pre-established limits which would indicate equipment failure or serious degradation resulting in the equipment failing to perform its intended functions.

A micro-processor based computer is used to analyze the measurands, as required, and correlates them, by means of mathematical extropolation to obtain the time at which failure, or a pre-established limit of degradation of the equipment is expected to occur. Visual and audio means are provided to indicate that the monitored equipment is operating properly or that a pre-determined degree of degradation has occured or is expected to occur by a given time.

12 Claims, 2 Drawing Figures

FIGURE 1 TYPICAL PARAMETER REPRESENTATION

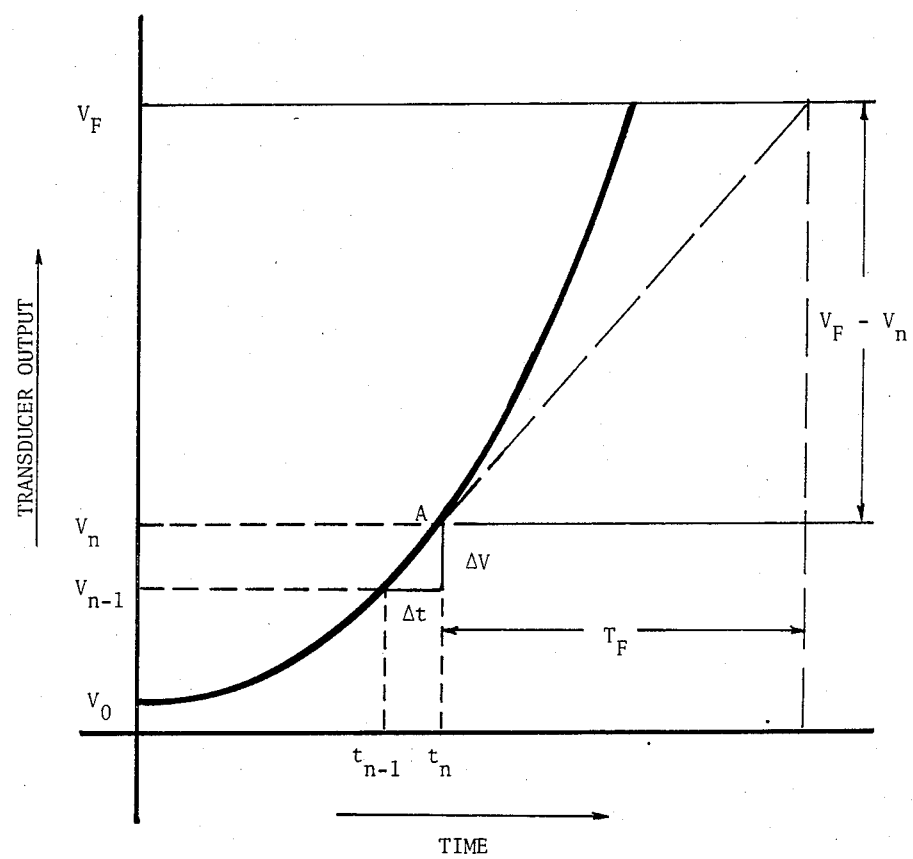
FIGURE 1 TYPICAL PARAMETER REPRESENTATION

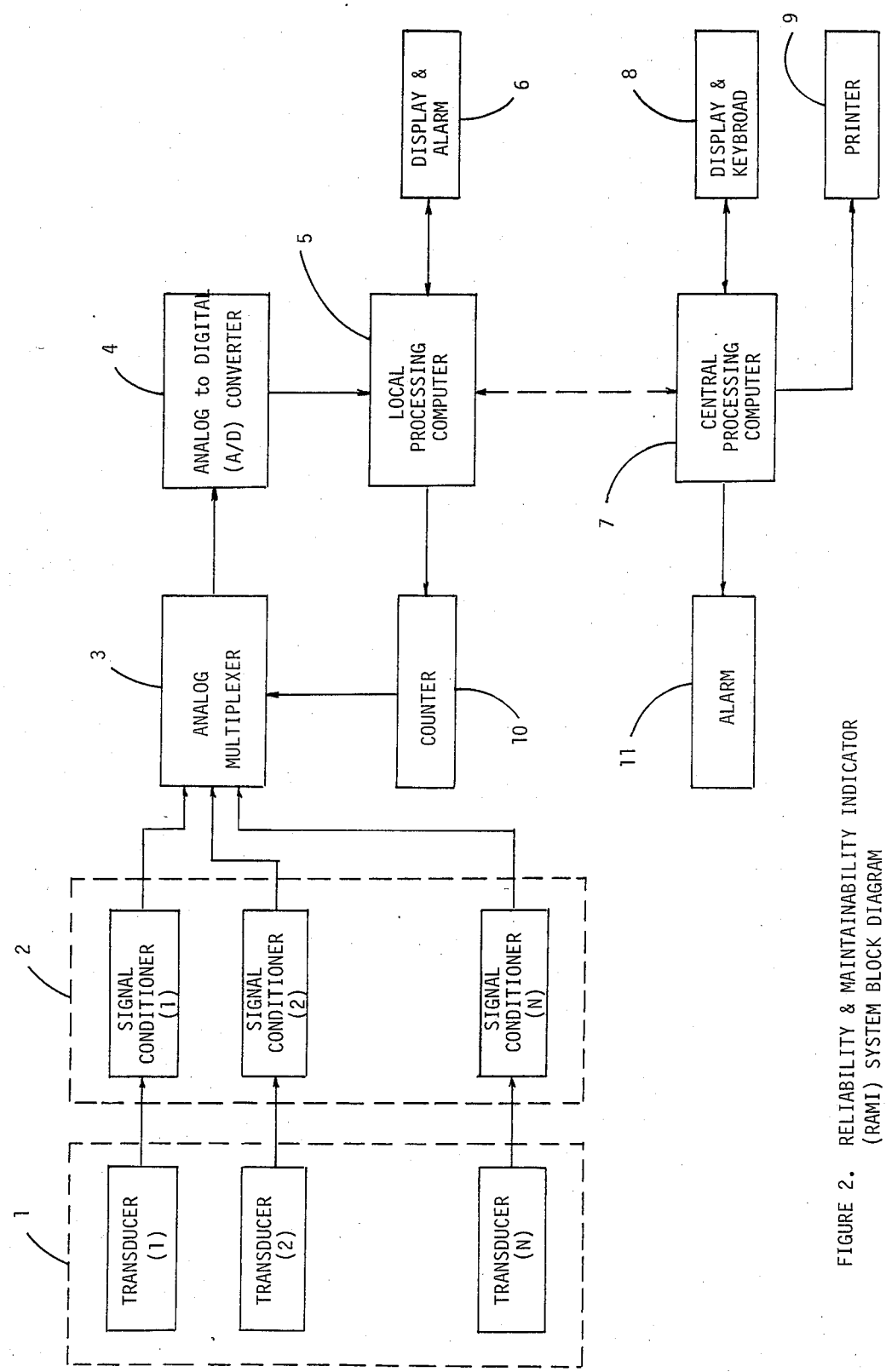
FIGURE 2. RELIABILITY & MAINTAINABILITY INDICATOR (RAMI) SYSTEM BLOCK DIAGRAM

RELIABILITY AND MAINTAINABILITY INDICATOR

This application is a continuation of application Ser. No. 542,452, filed Oct. 17, 1983, now abandoned.

BACKGROUND OF INVENTION

The field of the present invention relates to systems for indicating failure of equipment, and more particularly to such systems for giving advance warning of equipment failure.

The Reliability and Maintainability Indicator (RAMI) was invented to overcome problems currently existing as described in the following paragraphs:

One of the most challenging procedures in a process plant is to establish the proper time interval for scheduling preventive maintenance. Various philosophies have prevailed such as using experience, past practices, mechanic's judgement, manufacturer's recommendations, or not doing preventive maintenance at all. This latter school of thought emanates from the conviction that it is better to operate equipment until it fails than to accept the maintenance and penalty costs of shutting down prematurely. Other approaches have weighed the cost of shutdown versus the risk of continuing in operation. This has been done by using state of the art statistical methods with data processed by computer programs which print out the scheduled maintenance time. All of these approaches are based either on a statistical or practical approach but in no sense provide an optimum time of scheduling preventive maintenance as is possible with RAMI. To illustrate:

The most recent sophisticated trend has been to use failure and Maintenance data generated from a Failure and Maintenance Reporting System to calculate the probability of an equipment failing due to a degradation or wear out type of failure. This methodology has received wide acclaim and has been one of the most meritorious of all statistical procedures used. Basically it depends on an analysis of the Normal Statistical Distribution, or in the general case, on the Weibull Distribution. By means of these distributions it is possible to predict the probability of an equipment failing prior to, on or before, a certain time. This time is usually set as the lower confidence limit of the Mean Time Between Failure (MTBF) to insure that the preventive maintenance is performed prior to equipment failure. However, statistically many equipments would have survived for a longer period but are overhauled prematurely because statistical methods apply to populations of similar equipments which can not examine each equipment individually and only calls for scheduled maintenance when this particular equipment needs it.

The RAMI is an electronic device that provides an early warning of impending equipment failure for each individual equipment which it monitors. The principle advantage of RAMI is that it is relatively accurate and deals with analyzing individual equipment as opposed to statistical methods which can only analyze populations of similar equipment. For example, assumming a launch fleet powered by diesel engines; suppose we wanted to calculate the probability of an engine failure before 10,000 hours by statistical means, the result would be exactly that, i.e., a "probability" but this would not mean that a specific engine would fail prior to, or subsequent to a specific time. Therefore, with respect to a specific unit of an entire population, its status cannot be determined unless it is individually examined. This is exactly what is done by RAMI—it provides an individual examination of each unit. However, it is different from other electronic monitors which indicate when a unit has failed because RAMI provides an early warning of impending failure in quantitative terms. This early warning period is a variable depending on the amount of time an equipment has been in service and its level of degradation in performance.

The advantages of an early warning period is that it provides for a planning interval to secure maintenance personnel, tools and replacement parts thus keeping the down time and attendant penalty costs at a minimum. This eliminates the shortcomings of human judgement which has directly or indirectly resulted in "avoidable" failures and skyrocketing maintenance costs. However, with RAMI, by quantifying typical parameters such as noise, vibration, temperature, pressure, tensile stress, etc., timely corrective actions can be taken as a result of their being continuously monitored and problem areas projected.

The following are some of the benefits which would accrue by using RAMI:
(a) Schedule preventive maintenance only when required as indicated by RAMI.
(b) Optimize and control spare parts inventory.
(c) Reduce Maintenance Costs.
(d) Purchase spares and/or equipment for minimum total cost (and not only for minimum acquisition cost).
(e) Isolate the equipment or parts, which are problem areas.

SUMMARY OF INVENTION

Now in accordance with the present invention the foregoing objects and others as will become apparent in the course of the ensuing specifications, a system is described which can quantitatively predict in terms of the remaining hours of operation when a failure of a specific equipment will be expected to occur. Means are provided to measure key parameters of the equipment to be monitored using applicable transducers and to perform signal conditioning such that they can be suitable for conversion into digital form. Means are also provided to convert the measured key parameters into proper digital representations for processing by a digital computer. Means are also provided for a digital computer to receive digital data of the measured key parameters and to analyze the data through mathematical means to project the remaining time of operation of the equipment before failure is expected to occur. Means are also provided to yield on-site visual display so as to indicate that the system, equipment, component, or device being monitored is operating properly or that a pre-determined degree of degradation has occurred or is expected to occur by a given time. Audio means are also provided to alert the operator that predicted remaining time of operation of the equipment has reached a preset value. Means are also provided to transmit measured key parameter data or resulting information from data analysis to a central processing system for permanent or semi-permanent storage and for display/alarm. Means are also provided for a central processing system to collect data or information from many such on-site systems and to compile and create Reliability and Maintainability Reports. Means are also provided to receive manual inputs of maintenance management data by the central processing system, to process all such data, and to create and display other related maintenance management information such as Mean Time Between Failure (MTBF), total number of failures per cause of failure, and total operating time of each equipment.

BRIEF DESCRIPTION OF DRAWINGS

The present invention is diagrammatically illustrated, by way of example, in the drawings hereto, in which:

FIG. 1, is a typical parameter representation, depicting the simplest method of extrapolating, from a single parameter, the remaining time of operation of an equipment before failure or serious degradation of performance occurs.

FIG. 2, is a system block diagram, depicting a typical RAMI hardware configuration and the layout of the major components of the system.

DESCRIPTION OF PREFERRED EMBODIMENTS

The fundamental concept of the RAMI invention is explained by reference to FIG. 1. The ordinate is the scale for the output or a function of the output of a transducer monitoring a specific parameter V. The relative time t is shown on the abscissa. The coordinate of Point A are $V_n$ and $t_n$ and $V_F$ is the maximum tolerable output or the point at which failure will occur. Thus for any Point A the remaining time of operation, $T_F$, to reach a value of $V_F$ is indicated.

To understand this let us again refer to FIG. 1. Let $V_{n-1}$ be the value corresponding to time $t_{n-1}$ and $V_n$ be the value at $t_n$ where $\Delta t$ represents an arbitraily established constant interval at which monitoring will take place. The slope of the straight line at Point A is $\Delta V/\Delta t$ and assuming that the characteristic remains linear from this time to the time required for the straight line to intersect $V_F$ which is the value corresponding to failure is shown as $T_F$ on the graph. This can be calculated from the relationship:

$$T_F = \left( \frac{V_F - V_n}{V_n - V_{n-1}} \right) \Delta t \quad (1)$$

However, it is obvious that in most cases the characteristic does not remain straight. When $\Delta t$ is small and the number of samplings increase, the time to failure, $T_F$, approaches the true value since as the time of failure approaches the straight line and curve converges to an acceptable tolerance of accuracy.

The RAMI automatically calculates $T_F$ from the relationship of Equation (1). This is done when the transducer reads a value $V_n$ at a point in time at Point A and compared with a previous reading $V_{n-1}$ taken at a previous time. The difference between $V_n$ and $V_{n-1}$ occurs and the ratio of $\Delta V$ and $\Delta t$ represents the slope of the tangent at Point A. Then by substituting in Equation (1) the projected time to failure, $T_F$ is displsyed.

When Point A is at the early point in time, the projected time of $T_F$ is optimistic (or pessimistic as the case may be), however, as Point A moves to the right as a function of time, the extrapolated $T_F$ approaches the actual value.

The primary function of the projection of $T_F$ is to provide the maintenance manager with ample time to schedule preventive maintenance and therefore an accuracy to a reasonable degree is more than satisfactory for the intended purpose.

A typical configuration of the disclosed invention, a Reliability and Maintainability Indicator (RAMI), is illustrated in block diagram form as shown in FIG. 2, which indicates the representative components used in such a system. In this Figure, Block 1 shows the Transducers (total number N) which are used to measure the key parameters of an equipment. These Transducers convert the physical value of the key parameters into electrical signals. The output signals from Block 1 are each fed into their respective Signal Conditioner in Block 2 (a total number of N Signal Conditioners). Each of the respective electrical output signals from Block 1, is amplified, normalized, and/or filtered in the Signal Conditioners, in Block 2, and is brought into a form which is suitable to be converted into digital data for later processing by a digital computer. The outputs of Block 2 are then fed into an Analog Multiplexer 3 and then are converted into a series of 16-bit digital data by an Analog to Digital (A/D) Converter 4. The Analog Multiplexer 3 is controlled by a Counter 10 which is set by a signal from the Local Processing Computer 5. As the Local Processing Computer 5 decides to acquire data from the Transducers in Block 1, it clears the Counter 10 which in turn starts the multiplexing sequence in the Analog Multiplexer 3. As the Counter 10 reaches a count of N, It stops the Analog Multiplexer 3. As the Local Processing Computer 5 starts the Counter 10, it also starts data acquisition from the A/D Converter 4. Upon receiving N 16-bit data from the A/D Converter 4, the Local Processing Computer 5 stops data acquisition and starts data processing of the acquired data. The Local Processing Computer 5 is an 8-bit micro-processor based computer with 2 kilobytes of RAM (Random Access Memory) and 8 kilobytes of ROM (Read Only Memory). All the functions of the Local Processing Computer 5 are software driven. The major processing functions of the Local Processing Computer 5 are acquiring data from the A/D Converter 4, analyzing and extrapolating the acquired data based on the principles as illustrated in FIG. 1 to obtain the remaining time of operation of an equipment before failure, $T_F$, providing interface with Display and Alarm 6, and providing proper interface for data transmission with the Central Processing Computer 7. The Display and Alarm 6 displays the critical parameter corresponding to the minimum remaining time of operation and its value among the projected values obtained from the various key parameter measurements. A numerical key pad is also provided to allow manual interrogation of the status from other lesser critical parameters. The display is updated periodically corresponding to the most recent measurements. An audio alarm is also provided in the Display and Alarm 6 which would be set-off as the minimum remaining time of operation drops below a user predetermined value to alert the operator that immediate attention must be taken.

The Central Processing Computer 7 is also an 8-bit micro-processor based system equipped with 4 kilobytes of RAM, 64 kilobytes of ROM, and a permanent mass storage memory (usually a disk memory device). The major functions of the Central Processing Computer 7 are to collect data from one or more of the Local Processing Computers 6, to interface with a Display and Keyboard 8, Printer 9, and Alarm 11. The visual display (usually a Cathode Ray Tube) in Block 8 is provided for the management to review relevant information whereas the keyboard is provided for selecting displayed information as well as manual inputing of data related to the generation of maintenance management informations such as Mean Time Between Failure, number of failures, down time, mean down time, etc. to be used by the management. The Central Processing Computer 7 also interfaces with a Printer 9 which is provided to print out maintenance management reports and an Alarm 11 to alert the management of any emergencies where immediate attentions are needed.

The RAMI can be used on site by mounting it adjacent to the equipment being monitored and the output of the respective monitoring transducers can be connected directly with proper interface circuitry to a Local Processing Computer. It is also capable of being monitored by a Central Processing Computer located at a distance via appropriate data transmission links. If more than one Local Processing Computer are to be monitored by the Central Processing Computer, each local unit would be provided with a digital address and specific instruction codes such that the Central Processing Computer can address each unit and request the data to be transmitted.

Although but a single embodiment of the invention has been illustrated and described in detail, it is to be expressly understood that the invention is not limited thereto. Various changes may also be made in the design and configuration without departing from the spirit and scope of the invention as the same will now be understood by those skilled in the art.

We claim:

1. A method for predicting the time remaining for individual equipment to fail, comprising the steps of:
   (1) sampling at predetermined times the output signal of at least one transducer monitoring at least one key operating parameter of said equipment;
   (2) computing at given sampling times the slope of the curve formed by said output signal versus time;
   (3) extrapolating from said slope the remaining time for said operating parameter to cause said output signal to increase to a known amplitude representative of a failure condition for said equipment, the extrapolated time being indicative of the remaining time to failure; and
   (4) successively repeating steps (2) and (3) as said curve is generated, whereby said extrapolated time continues to reflect the slope of the said curve as said slope changes.

2. The method of claim 1 further including the steps of:
   (5) repeating steps (1) through (4) until the extrapolated time to failure reduces to a predetermined minimum value; and
   (6) activating an alarm mechanism for either one or a combination of automatically shutting down said equipment, or operating an alarm alerting an operator to take corrective action.

3. The method of claim 1, wherein step (2) further includes the step of dividing the change in amplitude by the change in time occurring between first and second sampling times, for obtaining the slope.

4. The method of claim 1, wherein step (3) further includes the step of computing the time to failure T from the following equation:

$$T = \left( \frac{V_F - V_n}{V_n - V_{n-1}} \right) \Delta t$$

where $V_F$ is the level of said output signal indicative of failure of said equipment, $V_n$ is the level of said output signal at one sampling time, $V_{n-1}$ is the level of said output signal at another sampling time previous to said one sampling time, and $\Delta t$ is the period of time elapsed between the times of occurrence of said one and previous sampling times.

5. The method of claim 1, further including the step of selectively printing out the extrapolated times to failure.

6. The method of claim 1, further including the step of storing each extrapolated time to failure.

7. The method of claim 6, further including the step of selectively displaying each extrapolated time to failure.

8. A system for providing an early warning indicator of impending equipment failure for an individual one out of a population of similar equipment, without requiring statistical analysis of the failure modes of populations of similar equipment, the improvement comprising:
   at least one transducer means connected to said equipment, for providing an output signal having a magnitude analogous to the operating condition of at least one key parameter of said equipment;
   sampling means for sampling said output signal at predetermined times;
   computing means receptive of the sampled portions of said output signal, for computing the slope of the curve formed by said output signal versus time at predetermined sampling times;
   extrapolation means for computing from the slope of said curve at a given sampling time, the expected time, $T_F$ remaining for the level of said output signal to reach a predetermined level where said equipment is expected to fail or degrade in performance; and
   means for successively recomputing the said slope of the output signal versus time curve as said curve is generated, whereby said extrapolated expected time $T_F$ reflects the slope of the said curve as said slope changes.

9. The system of claim 8, further including:
   a plurality of said transducer means connected to said equipment, each for monitoring a different key operating parameter of said equipment;
   said sampling means including means for sampling the output signals from each one of said plurality of transducer means at different sampling times;
   said computing means including means for computing the slopes of the curves formed by said output signals versus time at said sampling times, respectively; and
   said extrapolator means including means for computing from the slopes of said curves at given sampling times, the expected time remaining for the levels of said output signals, resectively, to attain levels known to be indicative of equipment failure or performance degradation.

10. The system of claim 9, further including:

means connected to said extrapolation means for visually displaying selected ones of the computed expected times to failure.

11. The system of claim 9, further including:

alarm means receptive of the time(s) remaining to failure for giving either one or a combination of audio or visual indicators that predetermined limits for the times remaining to failure, respectively, have been attained.

12. The system of claim 9, further including:

signal conditioning means receptive of said output signals for both amplifying and normalizing each one of said output signals;

multiplexer means receptive of said normalized output signals from said signal conditioning means, for multiplexing the signals onto a single output bus; and local processing computer means connected to said output bus of said multiplexer means, said computer means including said computing means and said extrapolating means, for processing said normalized output signals to obtain the expected times remaining to failure relative to the monitored key operating parameters, respectively.

* * * * *